United States Patent
Knirsch

(10) Patent No.: US 10,179,663 B2
(45) Date of Patent: Jan. 15, 2019

(54) LANDING DEVICE FOR A LOW GRAVITY LANDER

(71) Applicant: AIRBUS DS GMBH, Taufkirchen (DE)

(72) Inventor: Ulrich Knirsch, Markdorf (DE)

(73) Assignee: Airbus DS GmbH, Taufkirchen (DE)

( * ) Notice: Subject to any disclaimer, the term of this patent is extended or adjusted under 35 U.S.C. 154(b) by 176 days.

(21) Appl. No.: 15/209,316

(22) Filed: Jul. 13, 2016

(65) Prior Publication Data
US 2017/0015442 A1 Jan. 19, 2017

(30) Foreign Application Priority Data
Jul. 15, 2015 (EP) .................................... 15002096

(51) Int. Cl.
| | | |
|---|---|---|
| *B64G 1/62* | (2006.01) | |
| *B64G 1/22* | (2006.01) | |
| *B64G 1/10* | (2006.01) | |

(52) U.S. Cl.
CPC ............. *B64G 1/62* (2013.01); *B64G 1/222* (2013.01); *B64G 2001/1071* (2013.01)

(58) Field of Classification Search
CPC ... B64G 1/62; B64G 1/14; B64G 1/16; B64G 1/222; B64G 2001/1071
See application file for complete search history.

(56) References Cited

U.S. PATENT DOCUMENTS

| | | | | |
|---|---|---|---|---|
| 5,265,829 A | * | 11/1993 | Roberts | B64G 1/62 102/386 |
| 9,290,279 B2 | * | 3/2016 | Balemboy | B64G 1/62 |
| 2003/0208303 A1 | * | 11/2003 | Okamoto | B25J 9/06 700/245 |
| 2008/0111020 A1 | * | 5/2008 | Peterson | F42B 10/14 244/3.28 |
| 2012/0298796 A1 | * | 11/2012 | Carreker | B64G 1/22 244/100 R |

FOREIGN PATENT DOCUMENTS

WO    WO 2006/135606    12/2006

OTHER PUBLICATIONS

Extended European Search Report for Application No. 15002096.4 dated Jan. 5, 2016.
"Carbon-Based Electronics", Popular Mechanics, Hearst Communications Inc., New York, NY, US, vol. 175, No. 4, Apr. 1, 1998 (Apr. 1, 1998), p. 24, XP000765650, ISSN: 0032-4558.

(Continued)

*Primary Examiner* — Valentina Xavier
(74) *Attorney, Agent, or Firm* — Jenkins, Wilson, Taylor & Hunt, P.A.

(57) ABSTRACT

A landing device for a low gravity lander having a main body. The landing device comprises a number of leg-like rods attached to the main body, wherein, in a deployment position of the rods, each of the number of rods is inclined with regard to a plane of a first side surface of the main body such that the rods substantially extend in a direction of movement of the low gravity lander. Furthermore, the number of rods is made such that they bend or buckle under forces within a predetermined range by an impact due to a landing on a landing surface, thereby absorbing an impact momentum.

15 Claims, 2 Drawing Sheets

(56) References Cited

OTHER PUBLICATIONS

Anonymous: "Thunder Tiger "Training Gear Set" for Remote Controlled Toy Vehicle: Amazon.co.uk: Toys & Games", Dec. 23, 2010 (Dec. 23, 2010), XP055237263, Retrieved from the Internet: URL: http://www.amazon.co.uk/Thunder-Tiger-Training-Controlled-Vehicle/dp/B000CHQHHQ [retrieved on Dec. 17, 2015].
Anonymous: "Thunder Tiger Corp.—Training Gear No. 1079", Dec. 17, 2015 (Dec. 17, 2015), XP055237274, Retrieved from the Internet: URL: http://stock.thundertiger.com/product/1079.html [retrieved on Dec. 17, 2015].
"Training Gear 直?機練習架 Instruction Manual 使?說明書;", Dec. 17, 2015 (Dec. 17, 2015), XP055237275, Retrieved from the Internet: URL:http://mms.tiger.tw/upload/2011-3/20113163938.pdf [retrieved on Dec. 17, 2015].

\* cited by examiner

LANDING DEVICE FOR A LOW GRAVITY LANDER

CROSS-REFERENCE TO RELATED APPLICATION

This application claims priority to EP 15 002 096.4 filed Jul. 15, 2015, the entire disclosure of which is incorporated by reference herein.

TECHNICAL FIELD

The present disclosure relates to a landing device for a low gravity lander having a main body, wherein the low gravity lander comprises a number of legs. Furthermore, the disclosure herein relates to a low gravity lander.

BACKGROUND

Landing on a small body, like a comet, is particularly challenging. Even a very small impact velocity can lead to a rebound of the low gravity lander which might move the low gravity lander possibly back into deep space. Miniaturized landers cannot embark a reaction control system or a harpoon, as it was used by the low gravity lander Philae. Neither can miniaturized landers accommodate a full system of landing legs with a suspension as Philae had when landing on a comet. A simplified momentum absorption system would therefore be desirable.

Known landers have used airbags in the past. These need to be inflated at the right altitude. Hence, those landers require an altimeter. However, such altimeters are prone to malfunction. Airbags for use in space applications are also not trivial to test. For testing purposes, a vacuum chamber is required. The materials of the airbag are prone to aging and gas generators have a limited lifetime. The cost, mass and complexity are prohibitive, particularly for small landers, like low gravity landers.

Other landers have used a system of retro rockets and a sky crane lowering device. This system has a high complexity, resulting in a significant potential for contaminating a landing site.

To avoid a rebound upon landing on the landing site, the final impact velocity without having a momentum absorption device should be less than the local escape velocity. For small bodies, like low gravity landers, the velocity is in the order of several cm/s, i.e. a velocity already reached by a free fall from a small altitude. As a result, a landing device for the low gravity lander has to be deployed from a mother spacecraft extremely close to the surface of the landing site. This is inherently risky for the success of the low gravity lander or even the success of a whole mission because of the risk of the collision with the surface of the landing site.

SUMMARY

It is therefore an object of the present disclosure to provide a simplified landing device for a low gravity lander which enables secure and easy absorption of a momentum during landing on a landing site.

This object is solved by a landing device according to claim 1. Preferred embodiments are set out in the dependent claims.

A landing device for a low gravity lander having a main body comprises a number of leg-like rods attached to the main body. In a deployment position of the rods, each of the number of rods is inclined with regard to a plane of a first side surface of the main body such that the rods substantially extend in a direction of movement of the low gravity lander. The number of rods is made such that they bend or buckle under forces within a predetermined range by an impact due to a landing on a landing surface (landing site), thereby absorbing an impact momentum.

A low gravity lander according to this description is a lander, which does not need to move after having landed on its target. The purpose of a low gravity lander is, for example, to measure data, collect and send them for evaluation purposes to an evaluation processing device (e.g. a satellite or a ground station). The target may be a comet. However, it may be any other planet or spacecraft device as well.

The landing device according to the disclosure herein is a simple, purely passive momentum absorption device. It consists of or comprises deployable rods that bend or buckle under the forces generated by the impact, thereby absorbing the momentum. In other words, the number of rods is transforming kinetic energy of the low gravity lander into heat.

The landing device is vastly simpler, lighter and less costly than alternative landing devices as described above. The landing device may be implemented even on miniaturized landers. It tolerates all surface properties and most surface topologies.

Spacecrafts deploying such low gravity landers are no longer required to approach dangerously close to the target bodies.

According to a preferred embodiment, the number of rods is greater than three. In particular, the number of rods equals four. However, the number of rods can be greater than four as well.

The number of rods may be attached to the first site surface of the main body. However, depending on a deployment mechanism, they may be attached to a sidewall adjacent to the first side surface as well.

Having at least three rods assigned to the first side surface, it can be assured that the low gravity lander can stand on his rods after having landed on the landing surface.

According to a further preferred embodiment, the length of the rods is determined as a function of the inclination angle with regard to the plane of the first side surface and an expected roughness of the landing surface such that no part of the landing surface is supposed to contact the main body. The expected surface roughness of the landing site can be determined before a mission of the low gravity lander. The feature "no part of the landing surface is supposed to contact the main body" is to be understood in the sense that no part of the surface is supposed to contact the body of the lander before the number of rods have bent or buckled.

The length of the rods may be determined as a function of the stowage space such that, in a stowage position, the rods do not extend beyond the first side surface of the main body. In particular, the length of the rods should be made such that each of the rods can be made from one piece, i.e. does not need a hinge to have the desired length of the rod.

According to a further improvement, the inclination angle of the number of rods is in a range between 120° and 150°, in particular 135°. It is preferred that the number of rods extends, in the deployment position, beyond the lateral edges of the first side surface.

The first side surface of the main body of the low gravity lander can be regarded as the front side of the low gravity lander which is directed to the landing side during a landing process.

The number of rods may be hollow. As an advantage, the total mass of the low gravity lander can be reduced. The lower the total mass of the low gravity lander is, the smaller is the impact momentum which is advantageous with regard to the rebound during landing.

The thickness and/or material of the number of rods may be determined as a function of the expected impact momentum. The expected impact momentum is the product of the total mass of the low gravity lander and the impact velocity. The higher the expected impact momentum is, the stiffer and/or thicker the number of rods should be made.

According to a further embodiment, a free end of at least some of the number of rods may be bent (i.e. may have the shape of a bow). Alternatively or in addition a free end of at least some of the number of rods may be fitted with a disc. These embodiments are in particular helpful where the expected landing surface consists of or comprises a soft terrain. However, in the case where the number of rods penetrates the soft terrain, this would absorb as much momentum as the rods are buckling or bending. Hence, the design of the number of rods can be made compliant with various surface properties.

According to a further preferred embodiment, in the stowing position, the number of rods is stowed above each other such that they substantially extend parallel to the plane of the first side surface. The number of rods may be assigned to a number of pairs of rods. By folding down one set (pair) of rods over the other, the space needed for stowage of the number of rods is small.

The number of rods may be deployable by a swiveling mechanism. The deployment may be made using the resilience of the rods themselves. In an alternative embodiment, the deployment may be made by an actuation member, such as a spring. Attachment of the number of rods to the main body of the low gravity lander may be made with help of a hinge. It is sufficient if a respective hinge has only one degree of freedom.

By folding down one set of rods over the other, all rods on the side surface of the main body of the low gravity lander can be secured or held down or locked by a single hold down device.

The landing device may comprise an activatable launch lock to prevent premature deployment, the launch lock being a time release device which enables a deployment of the number of rods from their stowage position to their deployment position upon a triggering event. Deployment of the number of rods has to be avoided before the ejection of the low gravity lander from a mother spacecraft. Here, the launch lock ensures the prevention of the premature deployment. The launch lock may be opened immediately prior to the ejection from the mother spaceship. In an embodiment, a time release device may be used to secure the number of rods for a predetermined time, e.g. in the order of some minutes. The time release device may be a bimetallic or shape memory alloy which is preheated (in the mother spaceship) before ejection and then frees the number of rods after cooling down.

The triggering event in this embodiment is the forthcoming ejection of the low gravity lander from the mother spacecraft.

According to a further preferred embodiment the main body comprises a second side surface being arranged opposite to the first side surface of the main body wherein a further number of leg-like rods is assigned to or attached to the second side surface. In this embodiment it is preferred if the inclination angle of all number of rods is 135° with regard to their assigned side surface. As a result, no knowledge about the impact direction of the low gravity lander has to be known since any side surface of a substantially cubic low gravity lander will be "protected" by a sufficient number of rods on which the low gravity lander can land.

BRIEF DESCRIPTION OF THE DRAWINGS

The disclosure herein will be described in more detail by reference to the accompanying figures.

DETAILED DESCRIPTION

Figure 1:
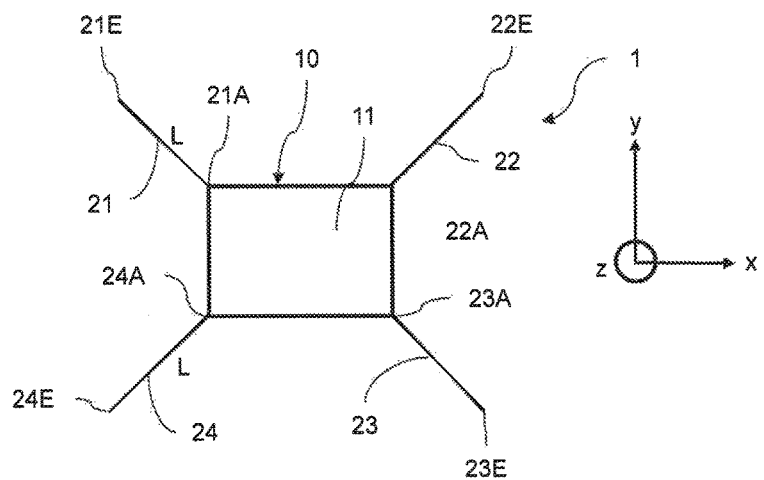
FIG. 1 shows a schematic view on a first side surface of a low gravity lander according to the disclosure herein.
Figure 2:
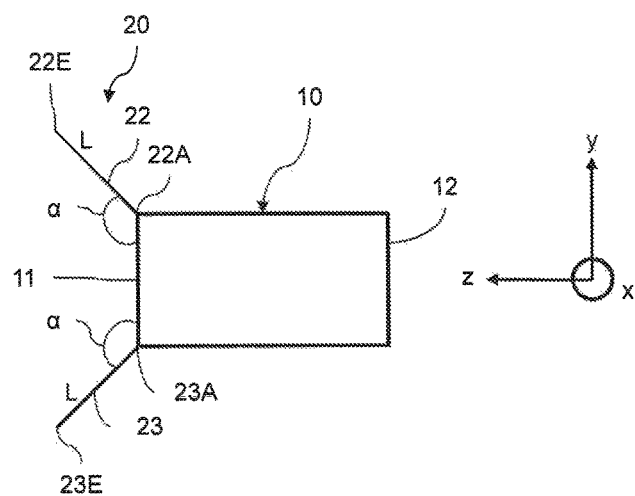
FIG. 2 shows a schematic view of the low gravity lander of FIG. 1 viewed from its right side.

FIG. 1 shows a low gravity lander 1, comprising a substantially rectangular main body 10 and a landing device 20 having a number of leg-like rods 21, 22, 23, 24 illustrated in their deployment position. The side wall of the main body 10 illustrated in FIG. 1 is a first side surface 11 corresponding to a front of the low gravity lander 1. The first side surface 11 has a substantially rectangular shape. However, it is to be understood that the rectangular shape of the first side surface 11 is by way of example only. The landing device 20 comprises four rods 21, 22, 23, 24 wherein a respective end 21A, 22A, 23A, 24A is attached to a respective corner of the side surface 11 or an adjacent area of a side wall extending orthogonal to the first side surface 11. As can be seen from FIG. 2 which shows the low gravity lander 1 of FIG. 1 from its right side, an inclination angle α between each rod 21, 22, 23, 24 and a plane of a first side surface 11 (corresponding to the x-y-plane of the illustrated coordinate system) is substantially 135°. In the shown deployment position of the landing device 20, the rods 21, 22, 23, 24 extend beyond the lateral edges of the side surface 11. The extension of the rods 21, 22, 23, 24 is such that the direction of extension is 45° with regard to the axes x, y and z of the coordinate system illustrated in FIGS. 1 and 2.

Each of the rods 21, 22, 23, 24 is made from a single piece of material, in particular a metal or a metal-alloy. The thickness and the material of the rods 21, 22, 23, 24 is such that the rods, in their illustrated deployment position, can bend or buckle under the forces generated by the impact due to a landing on a landing surface 40, thereby absorbing an impact momentum. Hence, the material of the rods 21, 22, 23, 24 is such that it is able to transform kinetic energy during the impact at landing into heat.

Figure 3:
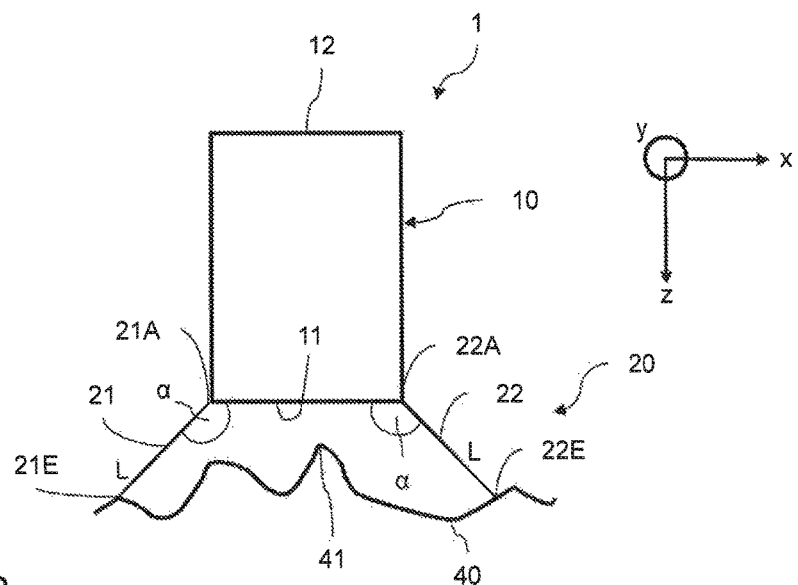
FIG. 3 shows a schematic view of the low gravity lander of FIG. 1 viewed from its top side seen in FIG. 1 and illustrating the determination of the length of the number of rods with regard to an expected surface roughness.

The length L of the rods 21, 22, 23, 24 is determined as a function of the inclination angle (see FIGS. 1 to 3 in which rods are depicted with length L and inclination angle α with regard to the first side surface 11) and an expected roughness of the landing surface such that no part of the landing surface is supposed to contact the main body of the low gravity lander 1 before the rods 21, 22, 23, 24 have buckled or bent. As can be seen from the side view of FIG. 3 which illustrates the low gravity lander 1 in a landing position on a landing surface 40, the landing surface 40 has one or more elevations 41 which are directed to the first side surface 11. The landing surface 40 can be determined in front of a mission of a low gravity lander.

The smaller the inclination angle α is the bigger the distance between the first side surface 11 and the landing surface 40 can be achieved. However, due to the resulting geometry of the landing device, the behavior of the rods 21, 22, 23, 24 might get stiffer. On the other hand, the larger the inclination angle α gets, the smaller the distance between the first side surface and the landing surface 40 gets. Thus, the danger of a contact of the main body 10 and an elevation 41 of the landing surface 40 rises. However, the stiffness of the landing device 20 and its rods 21, 22, 23, 24 is reduced.

Figure 4:
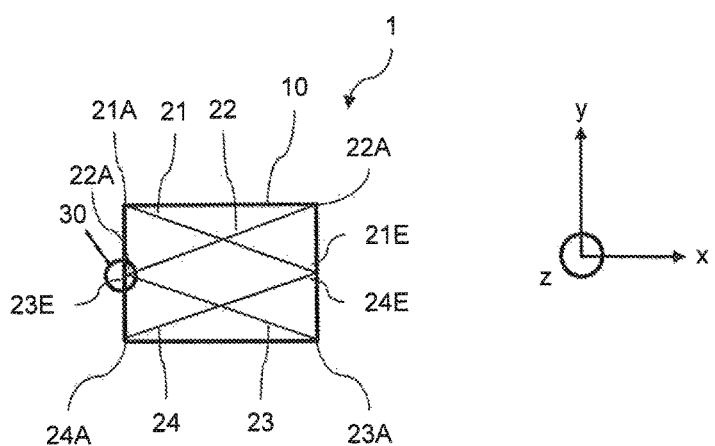
FIG. 4 shows a schematic view of a low gravity lander according to the disclosure herein where the number of rods is in a stowing position.

The length of the rods is further determined as a function of the stowage space such that, in a stowage position as illustrated in FIG. 4, the rods do not extend beyond the first side surface 11 of the main body 10.

The thickness and material of the rods 21, 22, 23, 24 are determined by the already chosen length L and by the expected impact momentum, i.e. the product of the total mass of the low gravity lander 1 and its impact velocity. The thicker the rods 21, 22, 23, 24 are the stiffer is their behavior resulting in a higher impact momentum. Hollow rods 21, 22, 23, 24 may be used for mass savings resulting in a reduced impact velocity.

Where a soft terrain of the landing surface 40 is expected, respective free ends 21E, 22E, 23E and 24E can be bent or fitted with a disc (not shown) to increase the area of contact. However, in the case of the rods 21, 22, 23, 24 penetrating the soft terrain, this absorbs as much momentum as the rods are buckling or bending. As a result, the design of the rods 21, 22, 23, 24 can be made compliant with various surface properties.

FIG. 4 shows the low gravity lander 1 with the landing device 20 in a stowing position of its rods 21, 22, 23, 24. By folding down rods 22 and 23 over rods 21 and 24, all four rods 21, 22, 23, 24 on the first side surface 11 of the main body 10 can be secured by a single hold down point 30. The hold down point may be a launch lock which is able to prevent premature deployment of the rods from its stowing position in FIG. 4 to its deployment position in FIGS. 1 to 3. Premature deployment of the rods 21, 22, 23, 24 has to be prevented before ejection of the low gravity lander 1 from a mother spacecraft. The launch lock 30 may be opened immediately prior to the ejection of the low gravity lander. A time release device such as a bimetallic or shape memory alloy may be used which secures the rods for a predetermined time (on the order of minutes) upon a triggering event. Upon triggering the bimetallic or shape memory alloy may be preheated before ejection which then frees the rods 21, 22, 23, 24 after cooling down. The time span between preheating should be sufficient to eject the low gravity lander from the mother spacecraft.

The rods 21, 22, 23, 24 can be deployed either by their own resilience or with respective additional deployment springs. In the latter, each respective end 21A, 22A, 23A, 24A is attached to the main body 10 with a hinge with only one degree of freedom.

If the low gravity lander 1 needs to self-right itself after the impact of the landing surface 40 it may jettison the rods 21, 22, 23, 24 after impact. Alternatively, the rods 21, 22, 23, 24 can be equipped with a predetermined breaking point close to its attached end to the main body (i.e. the attached ends 21A, 22A, 23A, 24A).

The landing device described is vastly simpler, lighter and less costly than alternative landing systems. The landing device can be fitted even on miniaturized landers. It tolerates all surface properties and most topologies.

As an advantage, spacecrafts deploying a low gravity lander as described are no longer required to approach dangerously close to the target bodies, such as a comet or a planet.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", an or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE LIST 1 low gravity lander
10 main body
11 first side surface
12 second side surface (being arranged opposite to the first side surface)
20 landing device
21 rod of a first pair of rods
22 rod of a second pair of rods
23 rod of a second pair of rods
24 rod of a first pair of rods
21E free end of rod 21
22E free end of rod 22
23E free end of rod 23
24E free end of rod 24
21A to main body 10 attached end of rod 21
22A to main body 10 attached free end of rod 22
23A to main body 10 attached free end of rod 23
24A to main body 10 attached free end of rod 24
30 launch lock
40 landing surface
41 elevation
L length of rods 21, 22, 23, 24
α Inclination angle

The invention claimed is:

1. A landing device for a low gravity lander having a main body, the landing device comprising a number of leg-like rods attached to the main body, wherein, in a deployment position of the rods during landing, each of the rods is inclined with regard to a plane of a first side surface of the main body such that the rods substantially extend in a direction of movement of the low gravity lander during landing, and wherein the rods are configured to bend or buckle under forces within a predetermined range by an impact due to the landing on a landing surface, thereby absorbing an impact momentum, wherein, in a stowing position, the rods are stowed above each other such that the rods substantially extend parallel to the plane of the first side surface.

2. The landing device according to claim 1, wherein the number of rods is greater than 3 or equals 4.

3. The landing device according to claim 1, wherein a length of the rods is determined as a function of an inclination angle with regard to the plane of the first side surface and an expected roughness of the landing surface such that no part of the landing surface is supposed to contact the main body.

4. The landing device according to claim 1, wherein a length of the rods is determined as a function of stowage space such that, in a stowage position, the rods do not extend beyond the plane of the first side surface of the main body.

5. The landing device according to claim 1, wherein an inclination angle of the number of rods with regard to the plane of the first side surface is in a range between 120° and 150° or particularly 135°.

6. The landing device according to claim 1, wherein the number of rods extends, in the deployment position, beyond lateral edges of the first side surface.

7. The landing device according to claim 1, wherein the rods are hollow.

8. The landing device according to claim 1, wherein a thickness and/or material of the rods is determined as a function of expected impact momentum.

9. The landing device according to claim 1, wherein a free end of at least some of the rods is bent.

10. The landing device according to claim 1, wherein a free end of at least some of rods is fitted with a disc.

11. The landing device according to claim 1, wherein the rods are deployable by a swiveling mechanism.

12. The landing device according to claim 1, wherein, in a stowing position, the rods are held/locked by a single hold down device.

13. The landing device according to claim 1, wherein the landing device comprises an activatable launch lock to prevent premature deployment, the launch lock being a time release device which enables a deployment of the rods from their stowage position to their deployment position upon a triggering event.

14. The landing device according to claim 1, wherein the main body comprises a second side surface arranged opposite to the first side surface of the main body, wherein a further number of leg-like rods is assigned to or attached to the second side surface.

15. A low gravity lander comprising a main body and a landing device according to claim 1.

* * * * *